Jan. 22, 1957 A. L. APPEL 2,778,527
METERING AND DISPENSING DEVICE
Filed Sept. 22, 1954 2 Sheets-Sheet 1

INVENTOR:
ANDREW L. APPEL,
BY George J Mager
HIS ATTORNEY

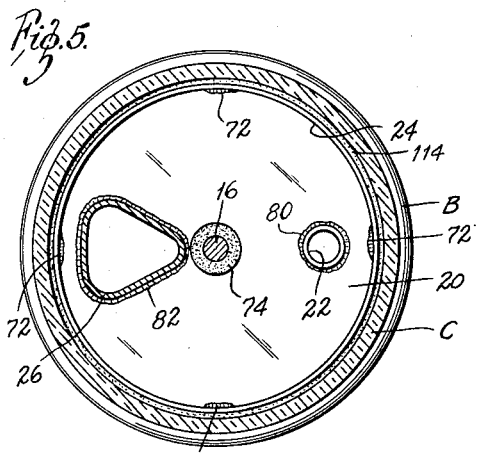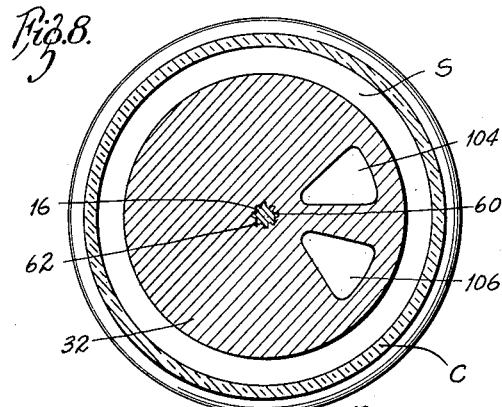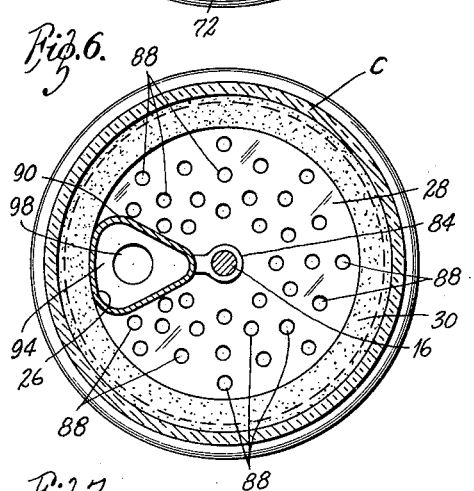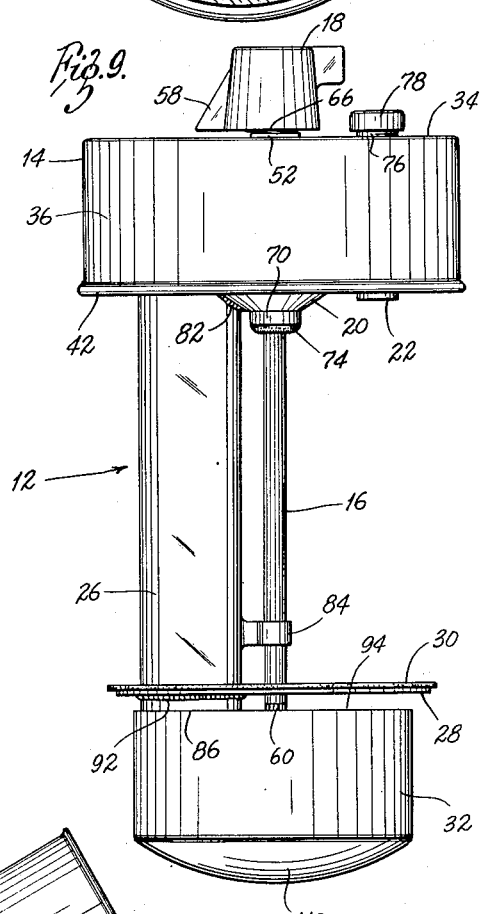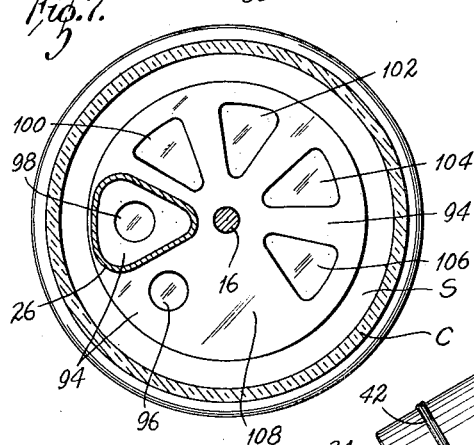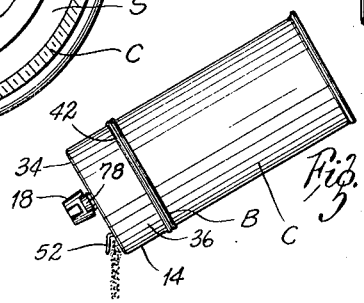
INVENTOR:
ANDREW L. APPEL,
BY George J Mager
HIS ATTORNEY

United States Patent Office 2,778,527
Patented Jan. 22, 1957

2,778,527

METERING AND DISPENSING DEVICE

Andrew L. Appel, St. Louis, Mo.

Application September 22, 1954, Serial No. 457,621

10 Claims. (Cl. 222—42)

The present invention relates to a novel and improved device designed to accurately measure and dispense granulated materials that are normally enclosed in handy containers.

More specifically stated, the present invention relates to a novel and improved device adapted for dispensing metered quantities of sugar, salt, bicarbonate of soda, baking powder, and so on. Thus, the invention is designed primarily, although not exclusively, for use in domestic and commercial kitchens, in bakeries, and in restaurants.

With respect first to the culinary art, it has been necessary heretofore for a cook to employ spoons, usually termed "measuring spoons," in order to obtain the requisite quantity of sugar, or salt, or baking powder and so on, to be added to the other ingredients prescribed in recipes for the preparation of foods. As is well understood, the success or failure of a dish or a cake for example, is frequently dependent upon the accuracy of the ingredients thereof, particularly those ingredients of the character enumerated above.

The primary object of my invention therefore is to provide a device, suitable for attachment to conventional containers, that incorporates means adapted to facilitate the measuring and dispensing of specific quantities of granulated and powdered ingredients for the preparation of comestibles.

It is another object of the present invention to incorporate means in the device whereby filling and refilling operations may be quickly accomplished without removing the device from the container whereon it is mounted.

It is further an object of the invention to provide a device that when not in use, seals the contents of the container against atmosphere. In other words, the instant invention includes means whereby granulated or powdered contents of the container whereon it is mounted are preserved in a dry state, so that the fluidity of them will not be impaired by moisture.

The invention includes a circular closure or cover member that is threaded internally, so that it may be removably secured in place on the upper externally threaded portion of a jar or container of well known configuration. It is to be understood however, that in the absence of a complemental threaded arrangement, the present device may be applied frictionally for example, to the open upper end of a suitable container.

As will be apparent from the description below and an inspection of the drawings that illustrate the preferred embodiment of my invention, all of the elements thereof are associated with and depend from the cover member aforesaid. That is to say, the device of the present invention comprises an organization of cooperative elements that in assembly is adapted to be removably positioned on the open upper end of a container as a unit. After this unit has been positioned thereon, the container may be filled via a short pipe that is normally closed at its upper end by means of a removable lid.

Preferably, the type of container herein contemplated is of glass, so that its contents are visible. In fact, the present device is primarily, though not necessarily, adapted for use with the well known type of glass containers for sugar found extensively on cafeteria and dining room tables. Such containers visibly demonstrate when they require refilling, and as mentioned earlier, such operations do not require removal of the device for a refilling operation.

The embodiment of the invention illustrated in the drawings is designed to accurately measure and dispense any selected one of six quantities of granulated or powdered material. In other words, a pinch, an eighth-teaspoonful, a quarter-teaspoonful, a half-teaspoonful, a three quarter teaspoonful, or a teaspoonful of material may be selected by rotating a knob projecting above the top of the cover member into a position wherein a pointer on the knob will coincide with a specific marking on the cover member top surface.

An opening is provided in the cover member whereby the metered quantities of material may be discharged, said opening being normally closed by a pivotally mounted flap member that functions by gravity. An inverted frusto-conical bowl or cup is disposed in the cover member below the discharge opening, and as will appear, the metered quantities of material flow into said cup and thence through said opening when the container is swung to discharge position. The control knob is rigidly attached to the upper end of a rotatable shaft. Secured to and supported on the lower end of said shaft is a drum provided with a circular series of compartments or cavities, each cavity being of a predetermined size. Rotation of the shaft by means of the control knob, effects the rotation of the drum whereby to bring one of the cavities into registration with the lower end of a stationary tube. The upper end of said tube is rigid with, and in fluid communication with, the frusto-conical cup aforesaid. The lower end surface of said tube is coplanar with the upper surface of the drum, and these surfaces are maintained in contiguous disposition by means of a compression spring, as will appear.

In addition to the primary discharge opening, the cover member may also have formed therein a plurality of small apertures that are also in communication with the chamber defined by the cup aforesaid in said cover member. This series of apertures is formed in the top face of the cover member in an area diametrically opposite said primary opening, and consequently metered quantities of material may be sprinkled onto meat, fish, vegetables, and so on.

There are other objects and advantages provided by the present invention over and above those already enumerated. These will be noted in the course of the detailed description of the invention to follow with reference to the drawings, wherein Figure 1 is a top plan view of a conventional glass container equipped with a metering and dispensing device that incorporates the concepts of the present invention;

Figure 2:
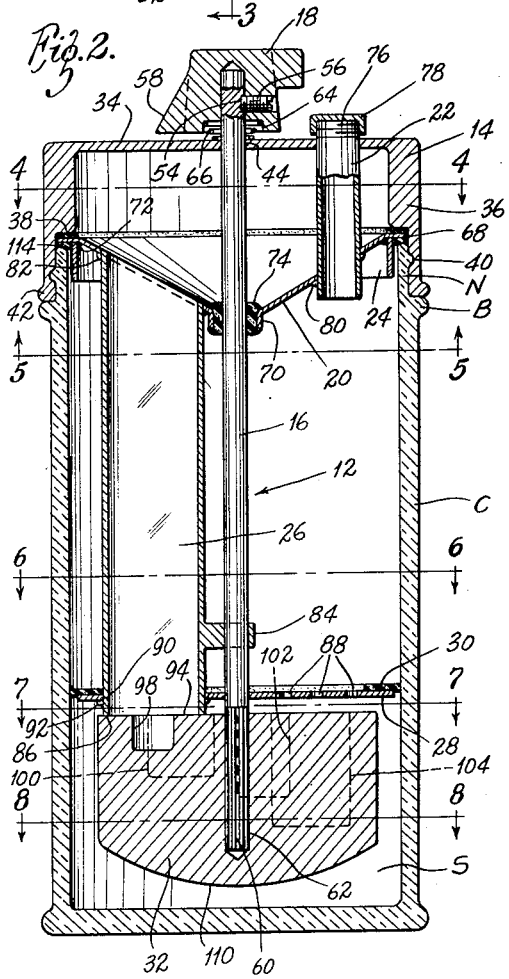
Figure 2 is a vertical sectional view taken on the line 2—2 of Figure 1.

Figures 5, 6, 7, and 8 are horizontal sectional views that are taken transversely of the container, and respectively on the lines 5—5, 6—6, 7—7, and 8—8 of Figure 2;

Figure 9 is a side elevational view of the device comprising the invention, this view exhibiting said device as a unitary assembly adapted for mounting partly atop and partly within a container; and Figure 10 is a reduced scale view of a container equipped with the device of Figure 9, the container being shown in an exemplary disposition of angularity for dispensing a previously metered quantity of material via the primary opening in the cover member.

Figure 3:
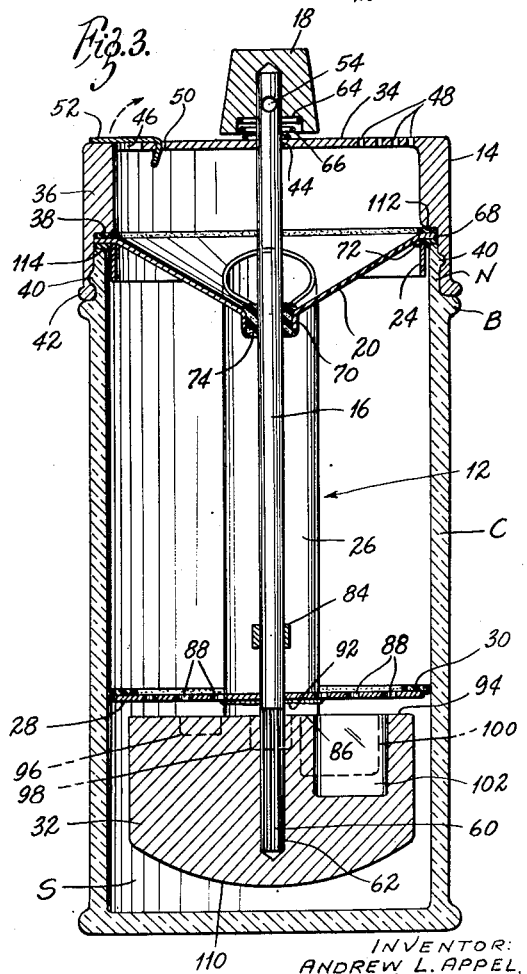
Figure 3 is a vertical sectional view taken on the line 3—3 of Figure 1.

With particular reference now to Figures 2, 3, and 9, numeral 12 designates generally an assembly or unit that incorporates all of the elements included in the device comprising the instant invention.

Broadly, these assembled elements consist of a cover member 14, a control shaft 16, a manually rotatable knob 18, an inverted frusto-conical cup member 20, a feed pipe 22, a guide ring 24, a material delivery tube 26, a perforated disk 28, an annular rubber gasket 30, and a metering drum 32.

The cover member 14 includes integrally a flat top wall 34, and a depending cylindrical side wall 36. Formed in the wall 36, is an annular recess or shoulder 38, and therebelow, said wall is threaded internally as at 40. Preferably, but not necessarily, the lower end of the wall 36 terminates in a circular bead portion 42. The top wall 34 of cover 14 has a central opening 44 therein to accommodate passage therethrough of the control shaft 16. Also formed in said top wall is what has hereinbefore been designated the primary discharge opening 46, and in a region of said top wall diametrically opposite thereto, the series of sprinkling apertures 48. Pivotally mounted in an elongated slot 50 provided in the top wall 34 adjacent the opening 46, is a closure flap 52 therefor. This flap member operates automatically in response to gravity as should be manifest.

The control shaft 16 projects upwardly through the opening 44 in the top wall 34 of the cover member, and preferably has formed therein a depression 54, as shown in Figures 2 and 3. This depression serves as a guide for positioning and affixing the knob 18 by means of a set screw 56, so that the pointer segment 58 of said knob may be properly dispositioned with respect to the metering drum 32, as is understood. The lower end of the shaft 16 is preferably splined, as indicated by the numeral 60, and pressfitted into a complementarily contoured opening 62 provided therefor in the drum 32. In consequence of this arrangement, the drum 32 is integrated with the control shaft 16 so as to be rotatable therewith.

As demonstrated in Figures 2 and 3, the knob 18 has formed therein an annular recess 64, and interposed about a portion of the shaft 16 between the top wall 34 of the cover member and said recess is a compression spring 66 that constantly serves to bias said shaft and the drum affixed thereto upwardly.

The frusto-conical cup member 20 terminates at its upper end in an outstanding annular flange 68, and at its lower end in a depending annular flange 70. Welded as suggested at 72 in Figures 2, 3, and 5, or otherwise secured to the underside of the flange 68, is the guide ring 24, and a rubber sleeve 74 that is seated in the depending flange 70 forms a seal about the shaft 16.

The feed pipe 22 extends through aligned openings provided therefor in the cover top wall 34 and the cup member 20. The upper projecting end 76 of said pipe is threaded externally for engagement by a removable cap 78 as shown. If desired, the threads may be dispensed with, and an ordinary cork or similar stopper may be employed to seal the upper end of the pipe. The lower end of pipe 22 is preferably welded to the undersurface of the cup member 20 as suggested at 80 in Figures 2 and 5.

The delivery tube 26, illustrated as having a generally triangular cross-sectional contour, is rigidly secured at its upper end to the cup member 20 by welding or the like as suggested at 82 in Figures 2 and 5. Numeral 84 indicates a guide or bearing extension for the lower portion of the control shaft, said bearing being rigid with the tube 26 as best seen in Figure 2. The lower surface of said tube is designated by the numeral 86.

With particular reference to Figures 2, 3, and 6, it is seen that the entire area of the disk 28 inwardly of the rubber gasket 30 is provided with perforations 88, and further, that said disk has formed therein an opening 90 that corresponds in shape to that of the delivery tube 26. The lower end of said tube extends through the opening 90 and is welded to the disk 28 about said opening as suggested at 92 in Figures 2 and 9. The gasket 30 is bonded to the upper surface thereof, and is of a slightly larger diameter than disk 28.

The metering drum 32 as hereinbefore noted, is suspended from the lower splined extremity 60 of the control shaft 16, the upper surface 94 of the drum being coplanar with the bottom surface 86 of the delivery tube, and being maintained in contiguous disposition relatively thereto by means of the compression spring 66.

With respect to the illustrated metering drum, the body thereof has formed therein six compartments or cavities, each sized to hold a predetermined volume or quantity of granulated or powdered material. Thus, with particular reference to Figure 7, the cavity 96 is sized to hold what is termed a pinch of material; cavity 98 being of greater depth will contain therein an eighth-teaspoonful of material; cavity 100 a quarter teaspoonful; cavity 102 a half teaspoonful; cavity 104 a three-quarter teaspoonful; and finally cavity 106 is of such size as to hold a teaspoonful of material. Numeral 108 designates a land intermediate the pinch cavity 96 and the teaspoonful cavity 106.

From the immediately foregoing paragraph, it should be manifest that in consequence of each approximately 51° rotary movement of the metering drum 32, either the land 108 or one of said cavities will be brought into registry with the lower extremity of the delivery tube 26.

The bottom surface of the metering drum is designated by the numeral 110. This surface is arcuately contoured for a reason to appear hereinafter.

Figure 1:
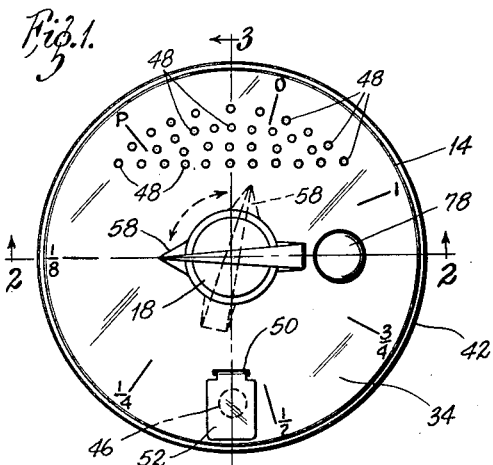
Figure 4:
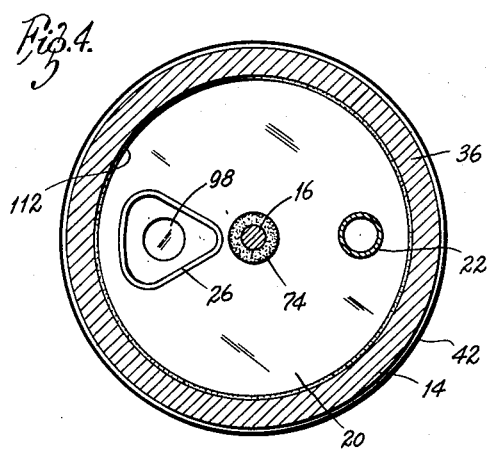
Figure 4 is a horizontal sectional view taken transversely of the cover member of the device on the line 4—4 of Figure 2.

With attention directed now to Figure 1, it is noted that the top wall 34 of the cover member 14 is marked to exhibit indicia whereby to guide the user in the manipulation of the control knob 18, as will be more comprehensively explained below.

Reverting now to Figures 2 and 3, it is observed that an annular gasket 112 is preferably interposed in the assembly 12 between the flange 68 of the cup member 20, and the shoulder 38 of the cover member 14. Preferably also, an annular gasket 114 is self-sustained about the guide ring 24 in contact with the underside of said flange 68.

The described and illustrated device 12 comprising this invention, is adapted for mounting on a conventional transparent container C, preferably of glass as illustrated. The container C has an externally threaded neck portion N the lower end of which is defined by the customary annular bead portion B. Thus the device 12 is simply screwed onto the neck portion N, with the internal thread 40 of the cover member engaging the external thread of said neck portion, until the beaded portions 42 and B are in contact. Thereupon the container is filled via the pipe 22 until the material level arrives approximately at the bead B. Assuming that this filling operation is performed with the knob 18 in the "off" or zero position demonstrated by broken lines in Figure 1, all of the cavities in the metering drum 32 will be filled to overflowing via the perforations 88, inasmuch as when the knob is in said zero position, the land 108 would be in registry with the lower end of the delivery tube 26.

In other words, when the pointer segment 58 is directed to the O marking, each of the cavities 96, 98, 100, 102, 104, and 106 is disposed beneath a plurality of the apertures 88, as should be manifest. The material that overflows these cavities trickles into the space S surrounding the drum 32, and in order to obtain a substantial filling of said space, the container C may be manually shaken slightly, as is understood.

USE

Although it is believed that the mode of operation should be clear from the foregoing description and the drawings, a brief explanation will be given, with ordinary table salt serving as an exemplary material. Thus, assuming the container C to be filled, and assuming further that a cook desires to add one eighth of a teaspoonful of salt to a stew for example, the dial 18 is swung from the dotted line position to the full line position thereof portrayed in Figure 1. In consequence, the drum 32 is rotated to bring the cavity 98 into registry with the lower end of delivery tube 26. The size of cavity 98 is such that it will hold exactly one eighth of a teaspoonful of salt, no more, no less, provided the upper level of the salt is flush with the upper surface 94 of the drum 32.

It is a feature of the invention that the contiguous coplanar disposition of the lower surface 86 of the delivery tube relatively to the upper surface 94 of the drum, insures such accuracy. In other words, as the cavity 98 passes into registry with the delivery tube, the lower end of the tube scrapes off any salt that lies above the plane of the surface 94, so that similar to passing a flat stick across a heaping spoonful of salt, a standard measurement is obtained.

Now as the container is tilted angularly into a position such as that illustrated in Figure 10, the one eighth teaspoonful of salt slides downwardly along the inner surface of tube 26, and thence into the cup member 20 to be discharged therefrom via the primary opening 46, the flap 52 having automatically swung to open position by gravity as the container was being tilted.

Obviously, the other quantities of salt or the like that the illustrated embodiment of my invention is designed to dispense may be metered in like manner, by simply turning the knob 18 until its segment 58 points to the proper marking on the top wall 34 of cover member 14.

Should it be desired to repeat the dispensing of a selected quantity of material, the knob 18 may be rotated to the right or to the left until its pointer passes an adjacent marking, whereupon the knob is returned to its former position, as should be clear.

Attention is directed to the apertures 48 located in an area of the cover top wall 34 that is diametrically opposite the closure flap 52. Should it be desired to sprinkle metered salt onto a porkchop, a steak, or a fish for example, it is merely requisite for the cook to grasp the container in such wise before tilting it, that the sprinkling apertures 48 will be lowermost in the dispensing operation, as should be manifest.

The rounded or arcuately formed bottom surface 110 of the metering drum facilitates rotation thereof, inasmuch as it functions in the manner of a bearing within that mass of salt therebelow.

The perforated disk 28 has a second function in addition to that described each time a dispensing operation takes place, with respect to the salt that fills the cavities then not in registration with the delivery tube, and the overflow salt then in the space S. Thus, whenever the container C is tilted as demonstrated in Figure 10, this salt will flow angularly downwardly through the perforations 88 into that portion of the container above the disk 28. Following the dispensing operation and subsequent erection and disposition of the container on a table or the like, the salt trickles downwardly to again fill the cavities and overflow into the space S.

In consequence of this arrangement, it should be apparent that the invention incorporates novel means for maintaining the salt in fluent condition. It is to be understood of course as stated above, that salt has been selected exemplarily only as the medium considered best suited to demonstrate the invention in use. Sugar and the other dry fluid materials enumerated hereinbefore could also be metered and dispensed in the manner set forth.

The invention is believed to provide a device particularly adaptable for mounting on conventional sugar containers found on restaurant and dining room tables throughout the land. These containers as is well known, are equipped with dispensing means, but insofar as I am aware, they do not embody any means whereby to regulate the amount of sugar to be dispensed. Consequently, a patron who desires, for example, two teaspoonfuls of sugar in his coffee or in his tea and so on, must rely on his own judgment as the sugar flows from the container discharge spout into the spoon he suspends therebeneath. Usually the sugar overflows the spoon, resulting in waste and tablecloth untidiness.

In an exemplary adaptation of the present invention to a sugar container of this type, the perforations 48 in the top wall of the cover member would be omitted. Further, the metering drum 32 would be provided with but three cavities, one having a teaspoonful capacity, another a half-teaspoonful capacity, and one cavity having a quarter teaspoonful capacity.

The immediately preceding explanation has been given by way of example, in order to demonstrate a non-illustrated modification contemplated by the present invention without departing from the principles thereof.

Wherefore, it is to be understood that changes in the precise illustrated form of the elements, or rearrangements of them in a manner that may be apparent to one skilled in this art, are contemplated to be within the scope of the present invention as set forth in the claims hereunto appended.

What I claim is:

1. In a device adapted for mounting on the open upper end of a container of the type described: a cover member for the container; a pipe for filling the container with granulated or powdered material; a removable cap for closing the upper end of the pipe; a frusto-conical cup member invertedly disposed and supported within the cover member in spaced relation relatively to the top wall of the cover member; a shaft rotatably supported centrally of the top wall of the cover member and the cup member; a knob affixed to the upper projecting end of said shaft to effect the rotation thereof; a metering drum affixed to the lower end of the shaft, said drum having formed therein a plurality of cavities each sized for the reception of a predetermined quantity of the material; a stationary tube opening at its upper end into said cup member and having its lower end surface coplanar with and contiguously disposed to the upper surface of said metering drum for delivering to said cup member the contents of one of said cavities when the container is tilted; and a primary discharge opening in the top wall of the cover member for dispensing said contents automatically in consequence of tilting the container.

2. In a device adapted for mounting on the open upper end of a container of the type described: the structure set forth in claim 1, plus a perforated disk coplanar with but in spaced relation relatively to said upper surface of the metering drum, said disk having a contral opening therein to accommodate said shaft, and having an annular rubber gasket bonded to the upper surface thereof, the peripheral diameter of the gasket corresponding to the inner peripheral diameter of the container.

3. In a device adapted for mounting on the open upper end of a container of the type described: the structure set forth in claim 1, plus a closure flap for said primary discharge opening, said flap being pivotally mounted in an elongated slot provided therefor in said top wall of the cover member, and being operative by gravity to automatically seal said opening when the container is not in use, and to automatically uncover said opening when the container is tilted.

4. In a device adapted for mounting on the open upper end of a container of the type described: the structure set forth in claim 1, and a series of small material sprinkling apertures formed in the top wall of the cover member in an area thereof diametrically opposite said primary opening.

5. In a device adapted for mounting on the open upper end of a container of the type described: the structure set forth in claim 1, and a compression spring interposed about a portion of said upper projecting end of the rotatably supported shaft between the top wall of the cover member and an annular recess formed in said knob, said spring serving to constantly bias said shaft and the metering drum affixed to the lower end thereof in an upward direction.

6. In a device for metering and dispensing granulated or powdered materials such as salt and the like contained in a container of the type described: a rotatably supported control shaft; a knob affixed to the upper end thereof to manually rotate said shaft; a drum affixed to the lower end of the shaft and surrounded by the material in the container; a plurality of circularly spaced cavities and a land formed in the drum, each cavity being sized to contain therein a predeterminate quantity of the material; a delivery tube adapted to register with a selected drum cavity responsive to rotation of said knob; and means for automatically dispensing the contents of the selected cavity in consequence of tilting the container.

7. In a device for metering and dispensing granulated or powdered materials such as salt and the like contained in a container of the type described: a rotatably supported control shaft; a knob affixed to the upper end thereof to manually rotate said shaft; a drum affixed to the lower end of the shaft and surrounded by the material in the container; a plurality of circularly spaced cavities and a land formed in the drum, each cavity being sized to contain therein a predeterminate quantity of the material; and means for automatically dispensing the contents of a selected one of said cavities in consequence of tilting the container, said means including a stationary delivery tube that has its lower end surface contiguously coplanar with the top surface of said drum, and a compression spring that biases the drum in a direction adapted to maintain a constant contiguous disposition of the drum top surface relatively to the lower end surface aforesaid of the tube, the selected cavity having been brought into registry with the tube responsive to the manual rotation of said knob prior to tilting the container.

8. In a device of the character and for the purpose described a metering drum rigidly secured within a container to the lower end of a rotatably supported shaft, said drum having a planar upper surface and an arcuate lower surface, and being entirely surrounded by a mass of granulated or powdered material contained in said container; a plurality of circularly spaced cavities formed in the drum and adapted to be automatically filled with material from the mass of material surrounding said drum, each cavity between the first and the last being progressively of increased extent; a land area provided on the planar upper surface of the drum intermediate said first and last cavities; a stationary tubular element having its lower end surface contiguously disposed relatively to the aforesaid planar upper surface of the drum, said land area being normally disposed beneath the lower end of said tubular element; and a knob affixed to the upper end of said shaft for manually rotating the drum whereby to bring a selected one of said cavities into registry with the lower end aforesaid of said tubular element.

9. In a device of the character and for the purpose described: the structure recited in claim 8, and compression spring means interposed about the upper end portion of said shaft between a stationary part of the device and an annular recess provided in said knob for maintaining constant the contiguous disposition of the lower end surface of said tubular element relatively to the coplanar upper surface of said metering drum.

10. A self-contained unitary device adapted for disposition atop a container of the type described, said device including in assembly: a cover member having a flat top wall and a depending cylindrical side wall that terminates in a bead portion; an annular recessed portion formed in said side wall; an internally threaded portion formed in said side wall below the annular recessed portion; a shaft the upper end of which projects above said top wall of the cover member; a central opening in the top wall to accommodate passage therethrough of said shaft; a primary discharge opening formed in the top wall of the cover member, said opening being normally sealed by a closure flap pivotally mounted in an elongated slot provided therefor in said top wall; a plurality of sprinkling apertures formed in an area of said top wall diametrically opposite the primary opening; circularly spaced indicia marked on the upper surface of said top wall; a control knob having a pointer segment rigidly affixed to the projecting upper end of said shaft; a compression spring interposed about said upper end of the shaft between the cover member top wall and an annular recess formed in said knob; a frusto-conical cup member terminating at its upper end in an outstanding annular flange and at its lower end in a depending annular flange seated in the recess of the cover member side wall with an annular gasket interposed between said recess and the outstanding annular flange aforesaid; a guide ring having a self-sustained annular gasket thereabout depending from and rigidly secured to the underside of said annular flange; a rubber sleeve seated in said depending annular flange of the cup member to form a seal about said shaft; a pipe extending through alined openings in the top wall of the cover member and the conical wall of the cup member; a closure removably secured to the upper end of said pipe; a metering drum having a planar upper and an arcuate lower surface rigidly attached to and suspended from the lower end of said shaft; a land area and a plurality of circularly spaced cavities provided in the drum, each cavity being of a predetermined size; a stationary tubular element having a cross-sectional configuration adapted to surround any one of said cavities in fluid communication at its upper end with said cup member, and having a lower end surface coplanar with and contiguously disposed relatively to the upper surface of the metering drum; a bearing extension for the lower portion of said shaft rigid with the tubular element; a perforated disk in spaced relation relatively to the upper surface of said drum, said disk having a first opening therein to accommodate said shaft, and a second opening to accommodate the lower end portion of the tubular element; and an annular gasket having a peripheral diameter slightly larger than that of said disk bonded to the upper surface thereof.

References Cited in the file of this patent

UNITED STATES PATENTS

| 1,332,476 | Stough | Mar. 2, 1920 |
| 2,302,186 | Caretto | Nov. 17, 1942 |
| 2,401,684 | Cumilar | June 4, 1946 |
| 2,515,735 | Saunders | July 18, 1950 |